US012693510B2

(12) United States Patent
Huang et al.

(10) Patent No.: US 12,693,510 B2
(45) Date of Patent: Jul. 28, 2026

(54) ADJUSTABLE SUPPORT AND OPTICAL MODULE

(71) Applicant: Syncell (Taiwan) Inc., Taipei City (TW)

(72) Inventors: Wei-Cheng Huang, Taipei City (TW); Chang-Hsuan Chu, Taipei City (TW)

(73) Assignee: Syncell (Taiwan) Inc., Taipei City (TW)

( * ) Notice: Subject to any disclaimer, the term of this patent is extended or adjusted under 35 U.S.C. 154(b) by 112 days.

(21) Appl. No.: 18/748,710

(22) Filed: Jun. 20, 2024

(65) Prior Publication Data

US 2025/0389942 A1 Dec. 25, 2025

(51) Int. Cl.
*G02B 21/24* (2006.01)

(52) U.S. Cl.
CPC .................................... *G02B 21/24* (2013.01)

(58) Field of Classification Search
CPC .... F16M 13/02; F16M 2200/08; F16M 11/22;
F16M 13/022; F16M 2200/041; F16M
7/00; F16M 11/041; F16M 11/10; F16M
11/14; F16M 11/2014; F16M 11/242;
F16M 5/00; F16M 9/00; F16M 11/00;
F16M 11/046; F16M 11/06; F16M 11/08;
F16M 11/16; F16M 11/24; F16M 11/26;
F16M 11/34; F16M 2200/024; F16M
2200/047; F16M 2200/068; G02B 6/3825;
G02B 2006/4297; G02B 6/3849; G02B
6/3897; G02B 6/52; G02B 21/24
See application file for complete search history.

(56) References Cited

U.S. PATENT DOCUMENTS 5,352,026 A * 10/1994 Snook ..................... B60B 3/142
301/105.1
5,646,413 A 7/1997 Nishi
(Continued)

FOREIGN PATENT DOCUMENTS

DE 102018126232 B3 3/2020
TW 201013817 A 4/2010
(Continued)

OTHER PUBLICATIONS

Liao et al.; U.S. Appl. No. 18/997,408 entitled "Training AI model for a microscope-based pattern photoillumination system," filed Jan. 21, 2025.

(Continued)

*Primary Examiner* — Peter D Le
(74) *Attorney, Agent, or Firm* — Shay Glenn LLP

(57) ABSTRACT

An adjustable support includes an adapter, a supporting base, a supporting ring and a supporting column. The adapter is configured to be coupled with a module body. The adapter has a plurality of first inner threads. The supporting base is detachably connected with the adapter. The supporting base has a hollow space and a plurality of outer threads configured to couple with the first inner threads. The supporting ring is movably connected around the supporting base. The supporting column penetrates through the hollow space and is configured to abut against the adapter. When the supporting base is detached from the adapter, the supporting ring is configured to be moved relative to the supporting base to support the adapter.

20 Claims, 7 Drawing Sheets

(56)                  References Cited

U.S. PATENT DOCUMENTS

| | | | |
|---|---|---|---|
| 6,522,774 B1 | 2/2003 | Bacus et al. | |
| 6,614,031 B2 | 9/2003 | Engelhardt et al. | |
| 6,697,526 B1 | 2/2004 | Abe | |
| 6,947,583 B2 | 9/2005 | Ellis et al. | |
| 6,956,647 B2 | 10/2005 | Foster et al. | |
| 6,997,441 B2 * | 2/2006 | Yang | B65D 47/2031 |
| | | | 251/353 |
| 7,133,543 B2 | 11/2006 | Verwoerd et al. | |
| 7,460,732 B2 | 12/2008 | Recht | |
| 7,639,357 B2 | 12/2009 | Okugawa | |
| 7,817,273 B2 | 10/2010 | Bahatt et al. | |
| 8,187,866 B2 | 5/2012 | Duer | |
| 8,288,157 B2 | 10/2012 | Duer | |
| 8,923,568 B2 | 12/2014 | Olson et al. | |
| 9,019,598 B2 | 4/2015 | Tsurumune | |
| 9,030,547 B2 | 5/2015 | Vizi et al. | |
| 9,125,562 B2 | 9/2015 | Spencer et al. | |
| 9,217,694 B2 | 12/2015 | Sieckmann et al. | |
| 9,528,939 B2 | 12/2016 | Duer | |
| 9,557,156 B2 | 1/2017 | Kankarla | |
| 9,581,801 B2 | 2/2017 | Takamizawa | |
| 9,696,535 B2 | 7/2017 | Prakash et al. | |
| 9,788,790 B2 | 10/2017 | Black et al. | |
| 9,810,892 B2 | 11/2017 | Prakash et al. | |
| 9,939,381 B1 | 4/2018 | Kimmel et al. | |
| 10,514,278 B1 * | 12/2019 | Becker | G01D 11/30 |
| 10,517,482 B2 | 12/2019 | Sato et al. | |
| 10,729,326 B2 | 8/2020 | Spencer et al. | |
| 10,746,980 B2 | 8/2020 | Kenny et al. | |
| 10,932,670 B2 | 3/2021 | Smith et al. | |
| 11,265,449 B2 | 3/2022 | Liao et al. | |
| 11,408,821 B2 | 8/2022 | Boamfa et al. | |
| 11,513,328 B2 | 11/2022 | Pannhoff et al. | |
| 11,732,485 B2 * | 8/2023 | Livermore | E04F 15/02044 |
| | | | 52/126.6 |
| 11,789,251 B2 | 10/2023 | Liao et al. | |
| 2002/0008904 A1 | 1/2002 | Engelhardt | |
| 2003/0189676 A1 | 10/2003 | Kato et al. | |
| 2003/0231791 A1 | 12/2003 | Torre-Bueno et al. | |
| 2004/0105000 A1 | 6/2004 | Yuri | |
| 2004/0174589 A1 * | 9/2004 | Kinoshita | G02B 21/26 |
| | | | 359/383 |
| 2005/0072920 A1 | 4/2005 | Inada | |
| 2005/0082494 A1 | 4/2005 | Motomura | |
| 2005/0089208 A1 | 4/2005 | Dong et al. | |
| 2005/0179899 A1 | 8/2005 | Wasserman et al. | |
| 2005/0251983 A1 * | 11/2005 | Heaton | E03C 1/2665 |
| | | | 29/271 |
| 2006/0028717 A1 | 2/2006 | Dunn | |
| 2006/0175129 A1 * | 8/2006 | Brinkmann | E04G 7/08 |
| | | | 182/82 |
| 2006/0226375 A1 | 10/2006 | Maruo | |
| 2007/0152130 A1 | 7/2007 | Fomitchov | |
| 2008/0189893 A1 * | 8/2008 | Kim | A47K 7/02 |
| | | | 15/233 |
| 2008/0191111 A1 * | 8/2008 | Selle | A47B 91/024 |
| | | | 248/302 |
| 2008/0206752 A1 | 8/2008 | Balakirev et al. | |
| 2009/0195646 A1 | 8/2009 | Ganser et al. | |
| 2009/0316259 A1 | 12/2009 | Kenny et al. | |
| 2010/0079857 A1 | 4/2010 | Sasaki et al. | |
| 2010/0278399 A1 | 11/2010 | Bednarkiewicz et al. | |
| 2011/0050745 A1 | 3/2011 | Jung et al. | |
| 2012/0242817 A1 | 9/2012 | Pan | |
| 2013/0294645 A1 | 11/2013 | Sibarita | |
| 2014/0022373 A1 | 1/2014 | Kanarowski et al. | |
| 2014/0152794 A1 | 6/2014 | Takahashi | |
| 2014/0190329 A1 * | 7/2014 | Hayes | G10D 3/18 |
| | | | 84/279 |
| 2014/0293407 A1 | 10/2014 | Amano et al. | |
| 2015/0168702 A1 | 6/2015 | Harris | |
| 2015/0185456 A1 | 7/2015 | Kishima | |
| 2015/0258352 A1 | 9/2015 | Lin et al. | |
| 2016/0124208 A1 | 5/2016 | Best et al. | |

| | | | |
|---|---|---|---|
| 2016/0302740 A1 | 10/2016 | Iyer et al. | |
| 2017/0059407 A1 | 3/2017 | Shiraiwa | |
| 2017/0090176 A1 | 3/2017 | Pospiech et al. | |
| 2017/0154236 A1 | 6/2017 | Masuura et al. | |
| 2017/0212342 A1 | 7/2017 | Rozsa et al. | |
| 2017/0248837 A1 | 8/2017 | Sato et al. | |
| 2017/0299784 A1 | 10/2017 | Mikkelsen et al. | |
| 2018/0136451 A1 | 5/2018 | Soenksen | |
| 2018/0177401 A1 | 6/2018 | Yang et al. | |
| 2018/0180642 A1 | 6/2018 | Shetty et al. | |
| 2018/0180885 A1 | 6/2018 | Holland et al. | |
| 2018/0203221 A1 | 7/2018 | Dai et al. | |
| 2018/0210183 A1 | 7/2018 | Nishikawa | |
| 2018/0284419 A1 | 10/2018 | Peschka et al. | |
| 2018/0313095 A1 * | 11/2018 | Heschel | E04H 12/2261 |
| 2018/0348500 A1 | 12/2018 | Naaman et al. | |
| 2019/0324240 A1 | 10/2019 | Shroff et al. | |
| 2019/0339456 A1 | 11/2019 | Ruggles | |
| 2019/0391078 A1 | 12/2019 | Cohen et al. | |
| 2020/0346046 A1 | 11/2020 | Cannata et al. | |
| 2020/0379236 A1 | 12/2020 | Amthor et al. | |
| 2021/0065372 A1 | 3/2021 | Zhuk et al. | |
| 2021/0191094 A1 | 6/2021 | Ye et al. | |
| 2021/0224954 A1 | 7/2021 | Guo et al. | |
| 2021/0224992 A1 | 7/2021 | Mizukami et al. | |
| 2021/0252313 A1 | 8/2021 | Xu et al. | |
| 2021/0325309 A1 | 10/2021 | Neagle et al. | |
| 2022/0120664 A1 | 4/2022 | Rognin et al. | |
| 2022/0179321 A1 | 6/2022 | Ma et al. | |
| 2023/0418041 A1 | 12/2023 | Liao et al. | |
| 2024/0219703 A1 | 7/2024 | Liao et al. | |
| 2024/0219704 A1 | 7/2024 | Liao et al. | |
| 2024/0219705 A1 | 7/2024 | Liao et al. | |
| 2024/0411122 A1 | 12/2024 | Liao et al. | |
| 2025/0028162 A1 | 1/2025 | Liao et al. | |
| 2025/0028163 A1 | 1/2025 | Liao et al. | |
| 2025/0035910 A1 | 1/2025 | Liao et al. | |
| 2025/0052993 A1 | 2/2025 | Liao et al. | |

FOREIGN PATENT DOCUMENTS

| | | |
|---|---|---|
| WO | WO2016/133787 A1 | 8/2016 |
| WO | WO2023/220723 A1 | 11/2023 |
| WO | WO2023/220725 | 11/2023 |
| WO | WO2023/250466 A2 | 12/2023 |
| WO | WO2024/020363 A1 | 1/2024 |
| WO | WO2024/020406 A1 | 1/2024 |
| WO | WO2024/054817 A1 | 3/2024 |
| WO | WO2025/144992 A1 | 7/2025 |

OTHER PUBLICATIONS

Liao et al.; U.S. Appl. No. 18/997,412 entitled "Method of standardizing image pixel values in a microscope-based system," filed Jan. 21, 2025.

Liao et al.; U.S. Appl. No. 19/110,325 entitled "Microscope-based system and method of determining beam processing path," filed Mar. 10, 2025.

Alqattan et al.; Direct laser writing of nanophotonic structures on contact lenses; ACS nano; 12(6); pp. 5130-5140; Apr. 2018.

Aznar et al.; Gated materials for on-command release of guest molecules; Chemical reviews; 116(2); pp. 561-718; Jan. 27, 2016.

Bar et al.; Biotinylation by antibody recognition—a method for proximity labeling; Nature Methods; 15(2); pp. 127-133; (author Manuscript); 19 pages; Feb. 2018.

Branon et al.; Efficient proximity labeling in living cells and organisms with TurboID; Nature Biotechnology; 36(9); pp. 880-887; (Author Manuscript); 44 pages; Oct. 2018.

Brieke et al.; Light?controlled tools; Angewandte Chemie International Edition; 51(34); pp. 8446-8476; Aug. 20, 2012.

Chen et al.; Lattice light-sheet microscopy: imaging molecules to embryos at high spatiotemporal resolution; Science; 346(6208); 1257998; doi: 10.1126/scince.1257998; (Author Manuscript); 28 pages; Oct. 2014.

Cho et al.; Proximity labeling in mammalian cells with TurboID and split-TurboID; Nature Protocols; 15(12); pp. 3971-3999; Dec. 2020.

(56) References Cited

OTHER PUBLICATIONS

Christopher et al.; Subcellular proteomics; Nature Reviews; 1(1); doi10.1038/s43586-021-00029-y; (Author Muncscript): 55 pages; Apr. 2021.

Ezzoukhry et al.; Combining laser capture microdissection and proteomics reveals an active translation machinery controlling formation; Nature Communications; 9(1); doi:10.1038/s41467-018-04481-9; 11 pages. May 2018.

Fazal et al.; Atlas of subcellular RNA localization revealed by APEX-Seq; Cell; 178(2); pp. 473-490; Jul. 2019.

Hadley et al.; Determining composition of micron-scale protein deposits in neurodegenerative disease by spatially targeted optical microproteomics; eLife; 21 pages. doi: 10.7554/eLife.09579; Sep. 2015.

Hirsch et al.: Easily reversible desthiobiotin binding to streptavidin, avidin, and other bitin-binding proteins: uses for protein labeling, detection, and isolation; Analytical Biochemistry; 308(2); pp. 343-357; Sep. 2002.

Hung et al.; Protein localization in disease and therapy; Journal of Cell Science; 124(20); pp. 3381-3392; Oct. 2011.

Hung et al.; Spatially resolved proteomic mapping in living cells with the engineered peroxidase APEX2; Nature Protocols, 11(3); pp. 456-475; (Author Manuscript): 39 pages; Mar. 2016.

Itzhak et al.; A mass spectrometry-based approach for mapping protein neurons; Cell Reports; 20(11); pp. 2706-2718; Sep. 2017.

Jain et al.; ATPase-modulated stress granules contain a diverse proteome and substructure; Cell; 164(3); pp. 487-498; Jan. 2016.

Kamburov et al.; The consensusPathDB interaction database: 2013 update; Nucleic Acids Research; 41(D1); pp. D793-D800; Jan. 2013.

Kepiro et al.; Molecular tattoo: subcellular confinement of drug effects; Chemistry and Biology; 22(4); pp. 548-558; Apr. 2015.

Keren et al.; Structured tumor-immune microenvironment in triple negative breast cancer revealed by multiplexed ion beam imaging; Cell; 174(6); pp. 1373-1387; Sep. 2018.

Lam et al.; Directed evolution of APEX2 for electron microscopy and proximity labeling; Nature Methods; 12(1); pp. 51-54; (author Manuscript); 15 pages; Jan. 2015.

Liao et al.; A pioneering high content cell image-registered protein labeling system; 2017 Bio Taiwan Exhibition and Conference; 2 pages; Jun. 29-Jul. 2, 2017.

Liao et al.; High content cell image-registered protein labeling system; 2017 Bio Taiwan Exhibition and Conference; 14 pages; Jun. 29-Jul. 2, 2017.

Liu et al.; Super-resolution labeling with action-paint; Nature Chemistry; 11(11); pp. 1001-1008; https://doi.org/10.1038/s41557-019-0325-7; 11 pages; Nov. 2019.

Liu et al; Supplementary materials: super-resolution labeling with action-paint; Nature Chemistry: Supplementary Information; doi.org/10.1038/s41557-019-0325-7; 43 pages retrieved from the internet (https://yin.hms.harvard.edu/publications/2019.alp.sup.pdf); on Nov. 8, 2022.

Mahdessian et al.; Spatiotemporal dissection of the cell cycle with single-cell proteogenomics; Nature; 590(7847); pp. 649-654; (Author Manuscript); 51 pages; Feb. 2021.

Merritt et al.; Multiplex digital spatial profiling of proteins and RNA in fixed tissue; Nature Biotechnology; 38(5); pp. 586-599; (Author Manuscript); 50 pages; May 2020.

Mulvey et al.; Spatiotemporal proteomic profiling of the pro-inflammatory responses to lipopolysaccharide in the THP-1 human leukaemia cell line; Nature Communications: 12(1): doi.org/10.1038/s41467-021-26000-9; 19 pages; Oct. 2021.

Prier et. al.; Visible light photoredox cataysis with transition metal complexes: applications in organic synthesis; Chemical reviews; 113(7); pp. 5322-5363; (author Manuscript) 141 pages, Jul. 2013.

Qin et al.; Deciphering Molecular interactions by proximity labeling; Nature Methods; 18(2); pp. 133-143; Feb. 2021.

Qiu et al.; Determination of local chromatin interactions using a combined CRISPR and peroxidase APEX2 system; Nucleic Acids Research; 47(9); e52; 14 pages; May 2019.

Rhee et al.; Proteomic mapping of mitochondria in living cells via spatially restricted enzymatic tagging; Science; 339(6125); pp. 1328-1331; (Author Manuscript); 8 pages; Mar. 2013.

Rost et al.; Multiplexed ion beam imaging analysis for quanitation of protein expression in cancer tissue sections; Laboratory Investigation; 97(8); pp. 992-1003; Aug. 2017.

Roux et al.; A promiscuous biotin ligase fusion protein identifies proximal and interacting proteins in mammalian cells; Journal of Cell Biology; 196(6); pp. 801-810; Mar. 2012.

Roux et al.; BioID: A screen for protein-protein interactions: Current Protocols in protein Science; 91(1); pp. 19-23; (Author Manuscript); 20 pages; Jan. 2018.

Schurch et al.; Coordinated cellular neighborhoods orchestrate antitumoral immunity at the colorectal cancer invasive front; Cell; 182(5); pp. 1341-1359; Sep. 2020.

Thermofisher Scientific: Sulfo-SBED biotin label transfer reagent; (Product Discription); retrieved from the internet (https://www.thermofisher.com/order/catalog/product/33033#/33033); 5 pages; on May 5, 2021.

Thul et al.; A subcellular map of the human proteome; Science; 356(6340) eaal3321; 14 pages; May 2017.

Van Ineveld et al.; Revealing the spatio-phenotypic patterning of cells in healthy and tumor tissues with mLSR-3D and STAPL-3D; Nature Biotechnology; 39(10); pp. 1239-1245; (A.

Zheng et al.; Nanofabrication of high-resolution periodic structures with a gap size below 100 nm by two-photon polymerization; Nanoscale Research Letters; 14:134; pp. 1-9; Dec. 2019.

Zipfel et al.; Nonlinear magic: multiphoton microscopy in the biosciences; Nature Biotechnolgy; 21(11); pp. 1369-1377; Nov. 2003.

Ronneberger et al.; U-net: Convolutional networks for biomedical image segmentation. InMedical image computing and computer-assisted interventionRMICCAI 2015; 18th international conference; Springer international publishing; pp. 234-241; 2015 (the year of publication is sufficiently earlier than the effective U.S. filing date and any foreign priority date so that the particular month of publication is not in issue).

Stegmaier et al.; Real-time three-dimensional cell segmentation in large-scale microscopy data of developing embryos. Developmental Cell; 36(2); pp. 225-240; Jan. 25, 2016.

Wikipedia; Biotinylation; 4 pages; retrieved from the internet (https://en.wikipedia.org/w/index.php?title=Biotinylation&oldid=841539236) on May 16, 2018.

Liao et al.; U.S. Appl. No. 18/864,988 entitled "Method of calibrating a microscope system," filed Nov. 12, 2024.

Liao et al.; U.S. Appl. No. 18/864,997 entitled "Method of calibrating a microscope system," filed Nov. 12, 2024.

Chen et al.; U.S. Appl. No. 18/877,609 entitled "Microscope-based system and method using a UV-transmission mirror," filed Dec. 20, 2024.

* cited by examiner

400

A-A

ADJUSTABLE SUPPORT AND OPTICAL MODULE

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

The present disclosure relates to adjustable supports and optical modules installed with these adjustable supports. More particularly, the present disclosure relates to adjustable supports for supporting heavy optical modules, such as microscope modules.

BACKGROUND

With the continuous improvement of living standards nowadays, the demand for health has generally been increasing. Correspondingly, the accuracy of application of technology in the aspect of microscopic investigation has also become more important. For example, there is a tremendous demand for biochemical and microscopy techniques to assess regional protein complexity and function in tissues, cells, and organelles.

Current imaging-based spatial proteomics technologies require the use of validation antibodies and researchers often have to separate antibody validation to detect new proteins. A new image-based microscope system does not require the use of antibody panels and researchers can visualize and identify proteins at any interesting localization like the immune synapse or the small organelles. The underlying principle behind the image-based microscope system is its high-precision photolabeling, and the image-based microscope system is composed of three essential modules: a light source configured to trigger photochemical reaction, a light box configured to provide patterned illumination, and a microscope. Since microscopes are very heavy and are typically coupled with fixed foot stands, the optical alignment requires repetitive back-and-forth modifications between the light source and the light box, which is very labor-intensive and time-consuming. Accordingly, there exists a need for an adjustable base to support heavy optical equipment and perform optical alignment more easily as well.

SUMMARY OF THE DISCLOSURE

A technical aspect of the present disclosure is to provide an adjustable support, which can enhance the efficiency of overall adjustment of an optical equipment in an easy and convenient manner.

According to an embodiment of the present disclosure, an adjustable support includes an adapter, a supporting base, a supporting ring and a supporting column. The adapter is configured to be coupled with a module body. The adapter has a plurality of first inner threads. The supporting base is detachably connected with the adapter. The supporting base has a hollow space and a plurality of outer threads configured to couple with the first inner threads. The supporting ring is movably connected around the supporting base. The supporting column penetrates through the hollow space and is configured to abut against the adapter. When the supporting base is detached from the adapter, the supporting ring is configured to be moved relative to the supporting base to support the adapter.

In one or more embodiments of the present disclosure, the supporting base has a first inner surface, a second inner surface and a third inner surface. The third inner surface is connected between the first inner surface and the second inner surface. The first inner surface surrounds by a first diameter to define a first subsidiary hollow space. The second inner surface surrounds by a second diameter to define a second subsidiary hollow space. The first subsidiary hollow space and the second subsidiary hollow space are mutually communicated with each other and together define the hollow space.

In one or more embodiments of the present disclosure, the first diameter is less than the second diameter.

In one or more embodiments of the present disclosure, the supporting column includes a first subsidiary supporting column and a second subsidiary supporting column. The second subsidiary supporting column is connected with the first subsidiary supporting column. The first subsidiary supporting column is at least partially located in the first subsidiary hollow space and at least partially abuts against the first inner surface. The second subsidiary supporting column is configured to abut against the adapter and has a third diameter. The third diameter is larger than the first diameter and less than or equal to the second diameter.

In one or more embodiments of the present disclosure, the supporting column and the adapter are arranged in a vertical direction. The first subsidiary supporting column has a first length along the vertical direction. The first inner surface of the supporting base has a second length along the vertical direction. The first length is larger than the second length.

In one or more embodiments of the present disclosure, the second subsidiary supporting column has a third length along the vertical direction. The second inner surface has a fourth length along the vertical direction. The third length is larger than the fourth length.

In one or more embodiments of the present disclosure, the adapter includes a structural plate and a structural wall. The structural plate is configured to be coupled with the module body. The second subsidiary supporting column is configured to abut against the structural plate. The structural wall is connected with the structural plate and surrounds a portion of the supporting base. The structural wall has a plurality of first inner threads. The first inner threads are configured to couple with the outer threads.

In one or more embodiments of the present disclosure, the structural wall includes a guiding portion and a coupling portion. The coupling portion is connected between the structural plate and the guiding portion. The coupling portion has the first inner threads.

In one or more embodiments of the present disclosure, a farthest one of the first inner threads away from the structural plate defines a fifth length from the structural plate along the vertical direction. The guiding portion has a sixth length along the vertical direction. The sixth length is larger than the fifth length.

In one or more embodiments of the present disclosure, the fifth length is less than a difference between the first length and the second length.

In one or more embodiments of the present disclosure, the structural plate is spaced apart from the supporting base.

In one or more embodiments of the present disclosure, the structural plate has an abutting surface away from the structural wall. The abutting surface is configured to match with and abut against a bottom of the module body.

In one or more embodiments of the present disclosure, the supporting ring has a plurality of second inner threads. The second inner threads are configured to couple with the outer threads of the supporting base.

In one or more embodiments of the present disclosure, the supporting base includes a tubular portion and a flange portion. The tubular portion has the outer threads. The flange portion is connected with the tubular portion. The supporting ring is located between the adapter and the flange portion.

In one or more embodiments of the present disclosure, adjacent two of the outer threads define a pitch therebetween. A range of the pitch is between 0.5 mm and 20 mm.

In one or more embodiments of the present disclosure, the supporting ring has a thickness. A range of a ratio of the thickness corresponding to the pitch is between 4 and 50.

A technical aspect of the present disclosure is to provide an optical module, which can enhance the efficiency of overall adjustment of an optical equipment in an easy and convenient manner.

According to an embodiment of the present disclosure, an optical module includes a module body and the adjustable supports mentioned above. The adjustable supports are connected with a bottom of the module body and spaced apart from each other.

In one or more embodiments of the present disclosure, the module body is a microscope module.

BRIEF DESCRIPTION OF THE DRAWINGS

A better understanding of the features and advantages of the methods and apparatuses described herein will be obtained by reference to the following detailed description that sets forth illustrative embodiments, and the accompanying drawings of which.

DETAILED DESCRIPTION

Figure 1:
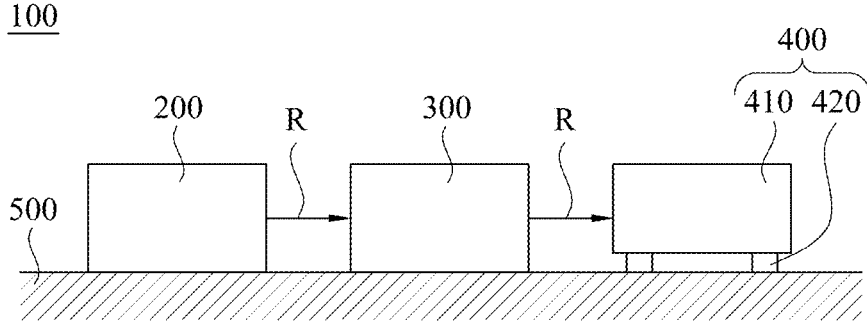
FIG. 1 is a side view of an optical equipment according to an embodiment of the present disclosure.

Drawings will be used below to disclose embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meanings as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference is made to FIG. 1, which is a side view of optical equipment 100 according to an embodiment of the present disclosure. The optical equipment 100 includes a light source module 200, a light box module 300, and an optical module 400, all of which may be mounted on or supported by a stage or platform 500. During an operation of the optical equipment 100, the light source module 200 emits a light ray R to the optical module 400 through the light box module 300, in which the light ray R is optically adjusted by the light box module 300 according to the actual situation. Furthermore, as shown in FIG. 1, the optical module 400 includes a module body 410 and a plurality of adjustable supports 420. The adjustable supports 420 are connected to or supporting a bottom surface of the module body 410. Moreover, each of the adjustable supports 420 can be individually adjusted in height, such that the height and the inclination angle of the module body 410 relative to the light ray R from the light box module 300 can be adjusted and the light ray R is able to reach the module body 410 at a desired orientation. In practice, the adjustment of the height and the inclination angle of the module body 410 relative to the light ray R from the light box module 300 can be adjusted after the light source module 200 and the light box module 300 are first fixed. Therefore, the efficiency of overall adjustment of the optical equipment 100 is highly enhanced. In practical applications, the module body 410 is a microscope module.

Figure 2:
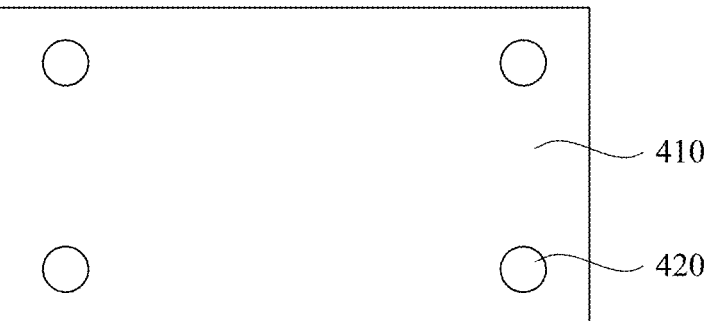
FIG. 2 is a bottom view of the optical module of FIG. 1.

Reference is made to FIG. 2. FIG. 2 is a bottom view of the optical module 400 of FIG. 1. For example, as shown in FIG. 2, the quantity of the adjustable supports 420 is four and the adjustable supports 420 are spaced apart from each other. Furthermore, for the structural stability of the optical module 400, the center of gravity of the module body 410 is practically located near the center of distribution of the adjustable supports 420. While four adjustable supports are shown in FIG. 2, it should be understood that any number of adjustable supports can be provided.

Figure 3:
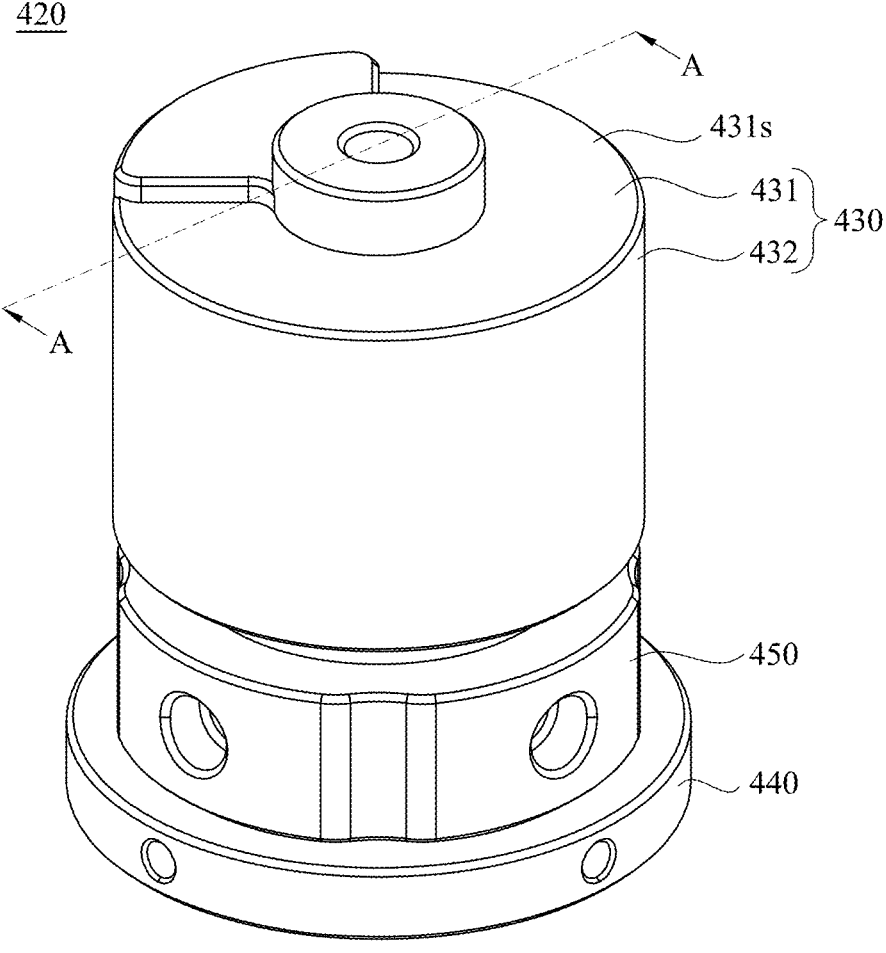
FIG. 3 is a schematic view of one of the adjustable supports of FIGS. 1-2.
Figure 4:
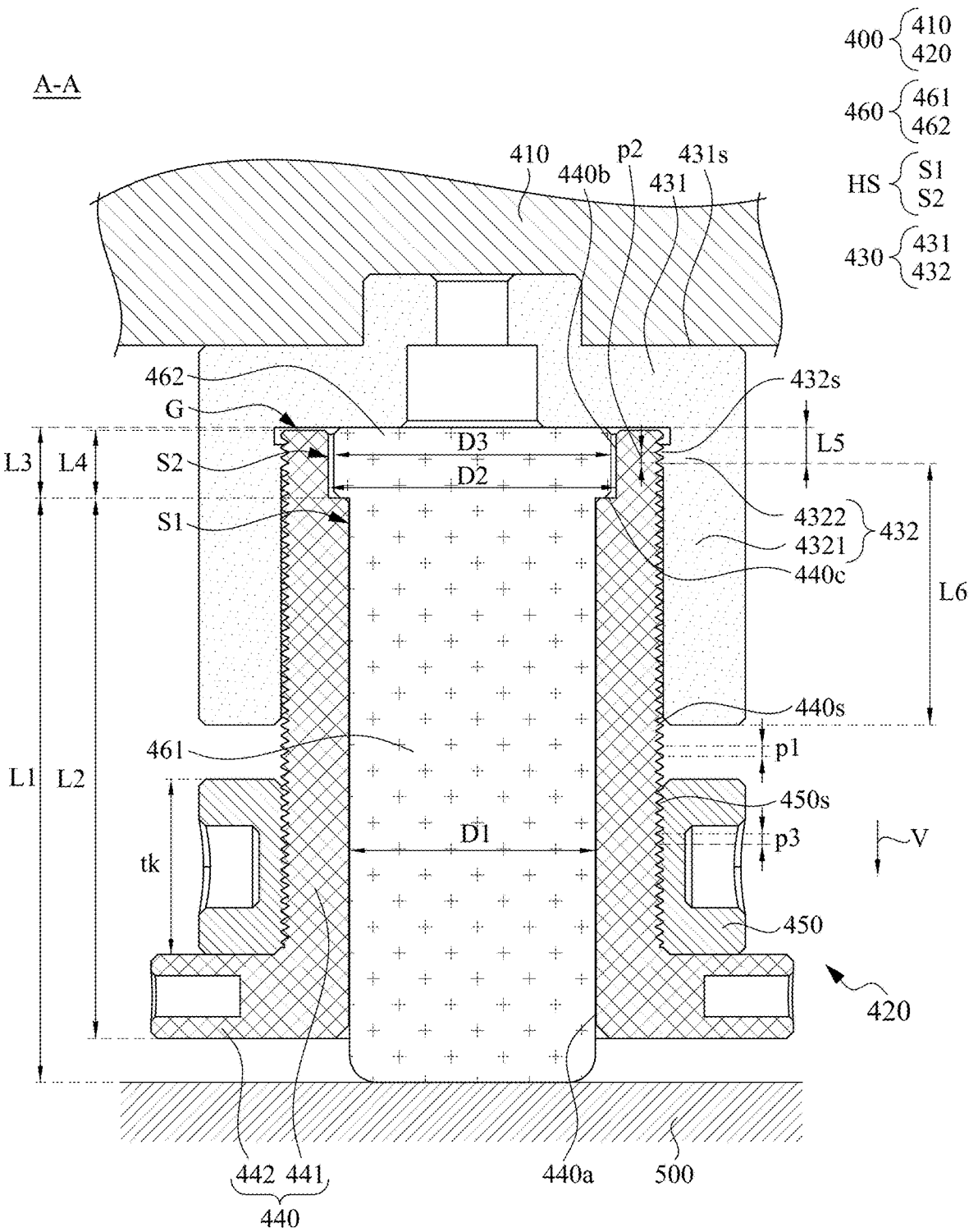
FIG. 4 is a sectional view along the sectional line A-A of FIG. 3.

Reference is made to FIGS. 3-4. FIG. 3 is a schematic view of an adjustable support 420, which can correspond to the adjustable supports of FIGS. 1-2. FIG. 4 is a sectional view along the sectional line A-A of FIG. 3. In this embodiment, as shown in FIGS. 3-4, the adjustable support 420 includes an adapter 430, a supporting base 440, and a supporting ring 450. The adapter 430 is configured to be coupled with the module body 410 (please see FIG. 4 for the module body 410). The supporting base 440 is detachably coupled to the adapter 430. The supporting ring 450 is movably connected around the supporting base 440.

Furthermore, in this embodiment, as shown in FIG. 4, the supporting base 440 has a hollow space HS and the adjustable support 420 further includes a supporting column 460. The supporting column 460 penetrates through the hollow space HS of the supporting base 440 and one end of the supporting column 460 is configured to abut against the adapter 430.

To be specific, as shown in FIG. 4, the supporting base 440 has a first inner surface 440*a*, a second inner surface 440*b* and a third inner surface 440*c*. The third inner surface 440*c* is connected between the first inner surface 440*a* and the second inner surface 440*b*. The first inner surface 440*a* is substantially parallel with the second inner surface 440*b*, and the second inner surface 440*b* is located between the first inner surface 440*a* and the adapter 430. The first inner surface 440*a* defines a first subsidiary hollow space S1 having a first diameter D1. The second inner surface 440*b* defines a second subsidiary hollow space S2 having a second diameter D2. The first subsidiary hollow space S1 and the second subsidiary hollow space S2 are mutually communicated with each other and together define the hollow space HS as mentioned above. Dimensionally speaking, the first diameter D1 of the first inner surface 440*a* is less than the second diameter D2 of the second inner surface 440*b*.

As shown in FIG. 4, the supporting column 460 includes a first subsidiary supporting column 461 and a second subsidiary supporting column 462. The second subsidiary supporting column 462 is connected with the first subsidiary supporting column 461. The first subsidiary supporting column 461 is at least partially located in the first subsidiary hollow space S1 surrounded by the first inner surface 440*a*. In addition, the first subsidiary supporting column 461 at least partially abuts against the first inner surface 440*a* of the supporting base 440, such that the supporting column 460 is not allowed to tilt relative to the supporting base 440. In this way, the overall strength of the adjustable support 420 is improved and a rigid structure of the adjustable support 420 is achieved.

Moreover, as shown in FIG. 4, the second subsidiary supporting column 462 is configured to abut against the adapter 430 and has a third diameter D3. The third diameter D3 of the second subsidiary supporting column 462 is larger than the first diameter D1 and is less than or equal to the second diameter D2, such that the second subsidiary supporting column 462 can only be accommodated in the second subsidiary hollow space S2 surrounded by the second inner surface 440*b* and is not allowed to move into the first subsidiary hollow space S1 of the supporting base 440.

In addition, as shown in FIG. 4, the supporting column 460 and the adapter 430 are arranged in a vertical direction V. The first subsidiary supporting column 461 of the supporting column 460 has a first length L1 along the vertical direction V. The first inner surface 440*a* of the supporting base 440 has a second length L2 along the vertical direction V. In this embodiment, the first length L1 of the first subsidiary supporting column 461 is larger than the second length L2 of the first inner surface 440*a*.

As shown in FIG. 4, the supporting base 440 has a plurality of outer threads 440*s*. The adapter 430 includes a structural plate 431 and a structural wall 432 connected with the structural plate 431. The structural plate 431 is configured to be coupled with the module body 410. To be specific, the structural plate 431 has an abutting surface 431*s* away from the structural wall 432 (please see FIGS. 3-4). It is worth to note that, in this embodiment, as shown in FIG. 3, the abutting surface 431*s* discloses a substantially fan-shaped protruding structure which is configured to match with and abut against the bottom of the module body 410 (e.g., a Nikon Ti2 inverted microscope). In other embodiments, the abutting surface 431*s* may have structures of different shapes in order to fit with a surface profile of the module body 410 of other brands and models for a secure support to the module body 410 by the adjustable support 420.

Referring back to FIG. 4, the second subsidiary supporting column 462 of the supporting column 460 is configured to abut against the structural plate 431 of the adapter 430. The structural wall 432 surrounds a portion of the supporting base 440. Moreover, the structural wall 432 has a plurality of first inner threads 432*s*. The first inner threads 432*s* of the structural wall 432 are configured to couple or engage with the outer threads 440*s* of the supporting base 440. Thus, when the first inner threads 432*s* are coupled or engaged with the outer threads 440*s*, rotation of the supporting base 440 relative to the adapter 430 causes the supporting base 440 to be detached from the adapter 430. Moreover, adjacent two of the outer threads 440*s* define a pitch p1 therebetween. In practice, for example, a range of the pitch p1 is between 0.5 mm and 20 mm. This means a range of the pitch p2 between adjacent two of the first inner threads 432*s* of the adapter 430 is also between 0.5 mm and 20 mm.

In addition, as shown in FIG. 4, the supporting ring 450 has a plurality of second inner threads 450*s*. The second inner threads 450*s* of the supporting ring 450 are configured to couple or engage with the outer threads 440*s* of the supporting base 440, such that the supporting ring 450 can move axially along the supporting base 440 when the supporting ring 450 is rotated relative to the supporting base 440. As mentioned above, since a range of the pitch p1 is between 0.5 mm and 20 mm, a range of the pitch p3 between adjacent two of the second inner threads 450*s* of the supporting ring 450 is also between 0.5 mm and 20 mm. In practice, if the pitch p1 (and also the pitch p3) is less than 0.5 mm, the strength of each of the outer threads 440*s* (and also each of the second inner threads 450*s*) may be insufficient. Moreover, the efficiency of movement of the supporting ring 450 relative to the supporting base 440 will be reduced. On the contrary, if the pitch p1 (and also the pitch p3) is more than 20 mm, the stability of connection of the supporting ring 450 to the supporting base 440 and also the precision in moving the supporting ring 450 relative to the supporting base 440 along the vertical direction V will be reduced instead.

Furthermore, as shown in FIG. 4, the supporting ring 450 has a thickness tk, while a range of a ratio of the thickness tk corresponding to the pitch p1 is between 4 and 50. In practice, if the ratio of the thickness tk corresponding to the pitch p1 is less than 4, the stability of connection of the supporting ring 450 to the supporting base 440 will be reduced. On the contrary, if the ratio of the thickness tk corresponding to the pitch p1 is more than 50, the efficiency of movement of the supporting ring 450 along the supporting base 440 will be reduced instead.

As shown in FIG. 4, the structural wall 432 of the adapter 430 includes a guiding portion 4321 and a coupling portion 4322. The coupling portion 4322 is connected between the structural plate 431 and the guiding portion 4321. The coupling portion 4322 has the first inner threads 432*s* disposed thereon.

To be specific, as shown in FIG. 4, a farthest one of the first inner threads 432*s* away from the structural plate 431 defines a fifth length L5 of the coupling portion 4322 measured from the structural plate 431 along the vertical direction V. Moreover, the guiding portion 4321 has a sixth length L6 along the vertical direction V. In this embodiment, the sixth length L6 of the guiding portion 4321 is larger than the fifth length L5 of the coupling portion 4322. In other words, a majority of the inner area of the structural wall 432 is free of threads.

Moreover, as shown in FIG. 4, the second subsidiary supporting column 462 of the supporting column 460 has a third length L3 along the vertical direction V. The second inner surface 440b of the supporting base 440 has a fourth length L4 along the vertical direction V. In this embodiment, the third length L3 of the second subsidiary supporting column 462 is larger than the fourth length L4 of the second inner surface 440b. Thus, the structural plate 431 of the adapter 430 is spaced apart from the supporting base 440. In other words, there is a gap G located between the structural plate 431 of the adapter 430 and the supporting base 440. The gap G is configured to prevent the weight of the module body 410 from pressing down on the supporting base 440, which would otherwise damage the first inner threads 432s of the adapter 430 and the outer threads 440s of the supporting base 440, thus causing the supporting base 440 to be loosened from the adapter 430.

Furthermore, as shown in FIG. 4, the supporting base 440 includes a tubular portion 441 and a flange portion 442. The tubular portion 441 has the outer threads 440s as mentioned above. The flange portion 442 is connected with the tubular portion 441 and is configured to be in contact with the stage 500 when the supporting base 440 is detached from the adapter 430. The supporting ring 450 is located between the adapter 430 and the flange portion 442 of the supporting base 440.

It is worth to note that, before the flange portion 442 of the supporting base 440 is in contact with the stage 500, as shown in FIG. 4, it is the supporting column 460 which is in contact with the stage 500 and provides support to the module body 410 through the structural plate 431 of the adapter 430. At this point, when the optical module 400 is moved and slid on the stage 500 with the second subsidiary supporting column 462 abutting against the stage 500, a narrower path of flat surface on the stage 500, on which the second subsidiary supporting column 462 slides, will be enough for a proper and safe movement of the optical module 400 on the stage 500.

Figure 5:
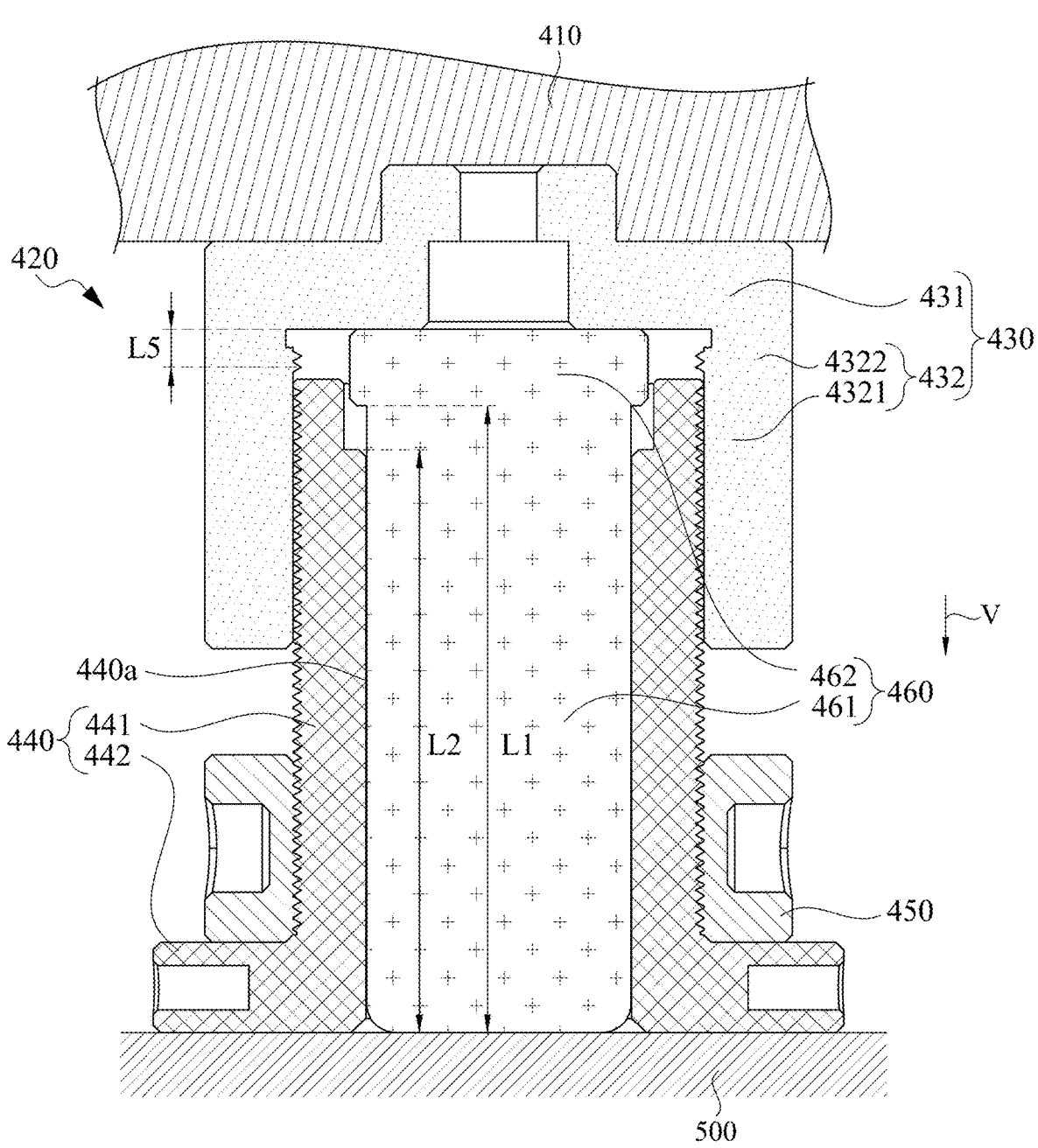
FIG. 5 is a sectional view of a subsequent status of the adjustable support of FIG. 4, in which the supporting base is detached from the adapter.

Reference is made to FIG. 5. FIG. 5 is a sectional view of a subsequent status of the adjustable support 420 of FIG. 4, in which the supporting base 440 is detached from the adapter 430. It is worth to note that, in this embodiment, as shown in FIG. 5, the fifth length L5 of the farthest one of the first inner threads 432s away from the structural plate 431, which is also the length of the coupling portion 4322 along the vertical direction V, is less than a difference between the first length L1 of the first subsidiary supporting column 461 and the second length L2 of the first inner surface 440a. Thus, when the optical module 400 is placed on a stage 500 with the first subsidiary supporting column 461 of the supporting column 460 being in contact with the stage 500, the supporting base 440 can be rotated relative to the adapter 430 such that there is enough room for the outer threads 440s of the supporting base 440 to be completely decoupled from the first inner threads 432s of the adapter 430 and thus the supporting base 440 to be completely detached from the adapter 430. At this point, the supporting base 440 is lowered by its self-weight and the flange portion 442 of the supporting base 440 is in contact with the stage 500, as shown in FIG. 5.

Figure 6:
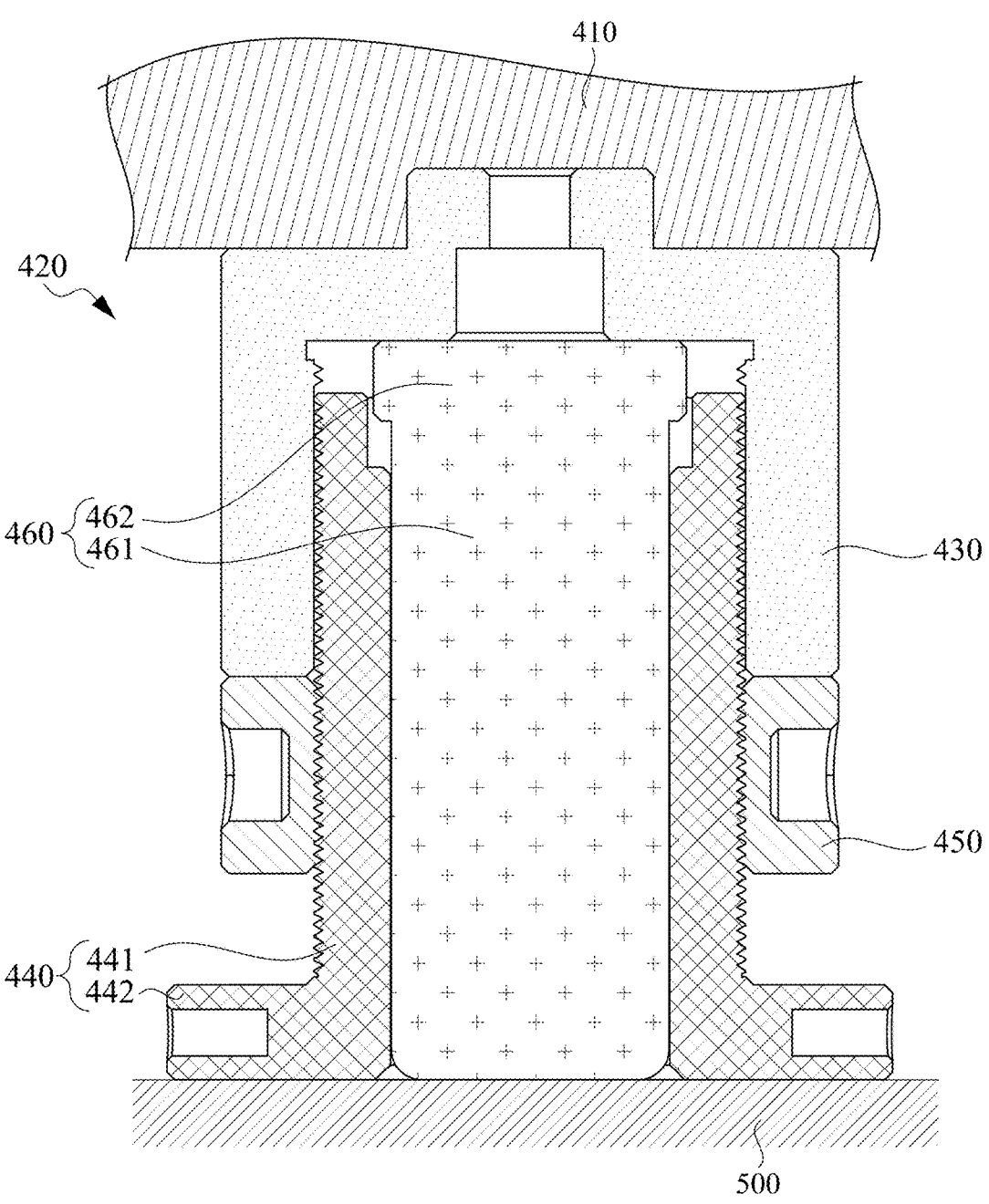
FIG. 6 is a sectional view of a subsequent status of the adjustable support of FIG. 5, in which the supporting ring is rotated and moved relative to the supporting base and is in contact with the adapter.

Reference is made to FIG. 6. FIG. 6 is a sectional view of a subsequent status of the adjustable support 420 of FIG. 5, in which the supporting ring 450 is rotated and moved relative to the supporting base 440 and is in contact with the adapter 430. Furthermore, as shown in FIG. 6, when the supporting base 440 is detached from the adapter 430 as mentioned above, the supporting ring 450 is rotated relative to the supporting base 440 such that the supporting ring 450 is moved along the supporting base 440 to support the adapter 430. At this point, as shown in FIG. 6, the adapter 430 is still in contact with the second subsidiary supporting column 462 of the supporting column 460 and is thus supported by the supporting column 460.

Figure 7:
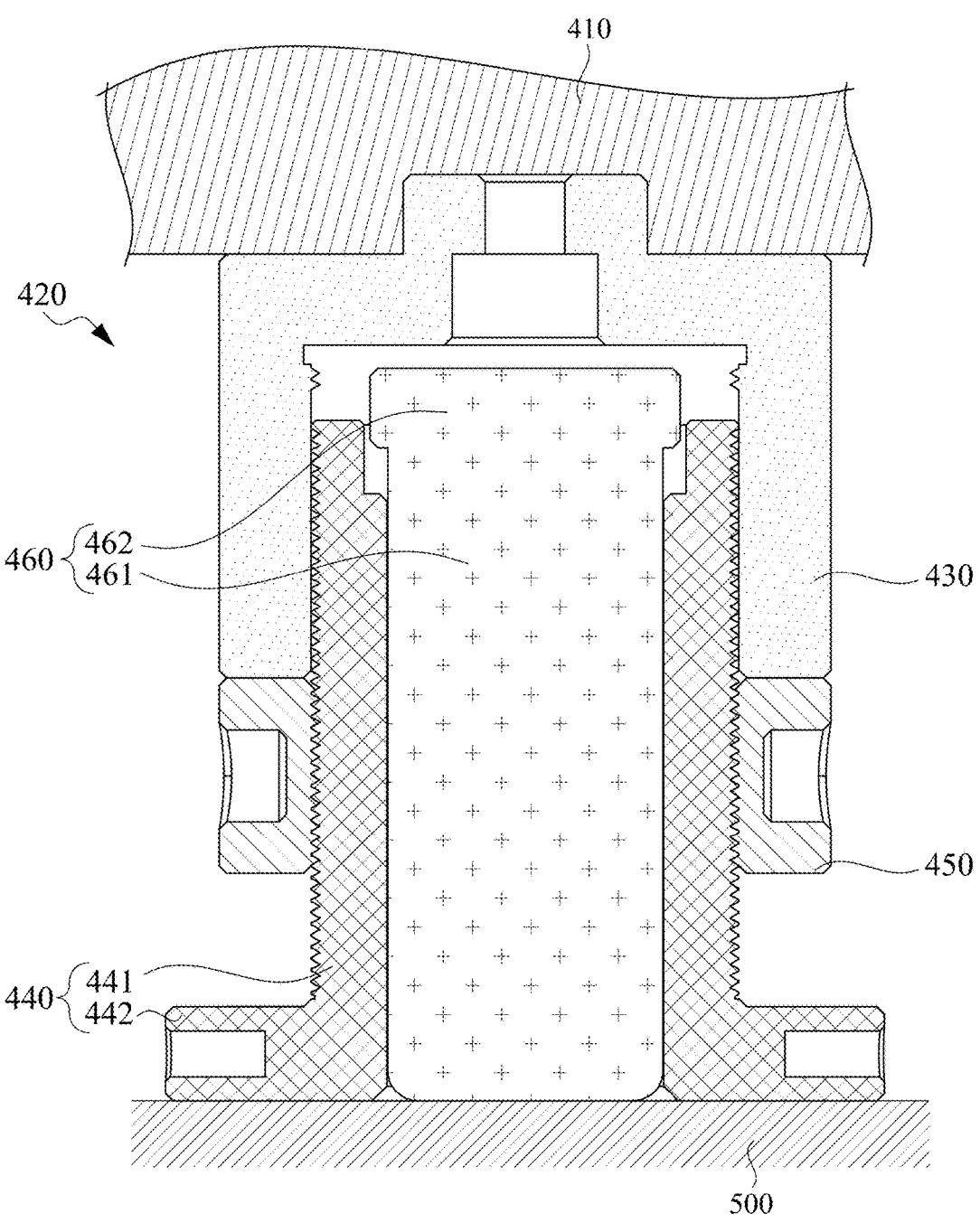
FIG. 7 is a sectional view of a subsequent status of the adjustable support of FIG. 6, in which the supporting ring is further rotated and moved relative to the supporting base such that the adapter is lifted up relative to the supporting base.

Reference is made to FIG. 7. FIG. 7 is a sectional view of a subsequent status of the adjustable support 420 of FIG. 6, in which the supporting ring 450 is further rotated and moved relative to the supporting base 440 such that the adapter 430 is lifted up relative to the supporting base 440. Furthermore, as shown in FIG. 7, when the supporting ring 450 is continued to be rotated relative to the supporting base 440 and moved along the supporting base 440, the supporting ring 450 presses against the adapter 430 such that the adapter 430 is lifted up relative to the supporting base 440. At this point, as shown in FIG. 7, the adapter 430 is moved away from the supporting column 460 and the overall height of the adjustable support 420 is increased. By adjusting the overall height of one or more of the adjustable supports 420 connected with the module body 410 according to the actual situation, the height and the inclination angle of the module body 410 relative to the light ray R from the light box module 300 (please see FIG. 1 for the light box module 300) can be adjusted and the light ray R is able to reach the module body 410 at a desired orientation.

In practice, the adjustment of the overall height of each of the adjustable supports 420 can be simply carried out by rotating the supporting ring 450 coupled around the supporting base 440 by a bare hand. Thus, the operation is easy and convenient.

Moreover, it is worth to note that, with the presence of the supporting column 460 located under the adapter 430, even if one of the supporting ring 450 or the supporting base 440 of one of the adjustable supports 420 is damaged and the adapter 430 loses its support, the supporting column 460 can provide support and effectively reduce the falling distance of the adapter 430. Thus, the impact to the module body 410 can be significantly reduced.

In conclusion, the aforementioned embodiments of the present disclosure have at least the following advantages:

(1) Since the adjustment of the height and the inclination angle of the module body relative to the light ray from the light box module is adjusted after the light source module and the light box module are first fixed, the efficiency of overall adjustment of the optical equipment is highly enhanced.

(2) Since the first subsidiary supporting column at least partially abuts against the first inner surface of the supporting base, the supporting column is not allowed to tilt relative to the supporting base. In this way, the overall strength of the adjustable support is improved and a rigid structure of the adjustable support is achieved.

(3) Since the adjustment of the overall height of each of the adjustable supports can be simply carried out by rotating the supporting ring coupled around the supporting base by a bare hand, the operation is easy and convenient.

(4) With the presence of the supporting column located under the adapter, even if one of the supporting ring or the supporting base of one of the adjustable supports is damaged and the adapter loses its support, the supporting column can provide support and effectively reduce the falling distance of the adapter. Thus, the impact to the module body can be significantly reduced.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. An adjustable support, comprising:
an adapter configured to be coupled with a module body, wherein the adapter has a plurality of first inner threads;
a supporting base detachably connected with the adapter, wherein the supporting base has a hollow space and a plurality of outer threads configured to couple with the first inner threads, wherein the supporting base has a first inner surface, a second inner surface and a third inner surface connected between the first inner surface and the second inner surface, the first inner surface surrounds by a first diameter to define a first subsidiary hollow space, the second inner surface surrounds by a second diameter to define a second subsidiary hollow space, the first subsidiary hollow space and the second subsidiary hollow space are mutually communicated with each other and together define the hollow space;
a supporting ring movably connected around the supporting base; and
a supporting column penetrating through the hollow space and configured to abut against the adapter, wherein the supporting column comprises a first subsidiary supporting column and a second subsidiary supporting column connected with the first subsidiary supporting column, the first subsidiary supporting column is at least partially located in the first subsidiary hollow space and at least partially abuts against the first inner surface, the second subsidiary supporting column is configured to abut against the adapter and has a third diameter larger than the first diameter and less than or equal to the second diameter,
wherein when the supporting base is detached from the adapter, the supporting ring is configured to be moved relative to the supporting base to support the adapter.

2. The adjustable support of claim 1, wherein the first diameter is less than the second diameter.

3. The adjustable support of claim 1, wherein the supporting column and the adapter are arranged in a vertical direction, the first subsidiary supporting column has a first length along the vertical direction, the first inner surface of the supporting base has a second length along the vertical direction, the first length is larger than the second length.

4. The adjustable support of claim 3, wherein the second subsidiary supporting column has a third length along the vertical direction, the second inner surface has a fourth length along the vertical direction, the third length is larger than the fourth length.

5. The adjustable support of claim 1, wherein the adapter comprises:
a structural plate configured to be coupled with the module body, the second subsidiary supporting column is configured to abut against the structural plate; and a structural wall connected with the structural plate and surrounding a portion of the supporting base, the structural wall has a plurality of first inner threads configured to couple with the outer threads.

6. The adjustable support of claim 5, wherein the structural wall comprises:
a guiding portion; and
a coupling portion connected between the structural plate and the guiding portion, the coupling portion has the first inner threads.

7. The adjustable support of claim 6, wherein a farthest one of the first inner threads away from the structural plate defines a fifth length from the structural plate along the vertical direction, the guiding portion has a sixth length along the vertical direction, the sixth length is larger than the fifth length.

8. The adjustable support of claim 7, wherein the fifth length is less than a difference between the first length and the second length.

9. The adjustable support of claim 5, wherein the structural plate is spaced apart from the supporting base.

10. The adjustable support of claim 5, wherein the structural plate has an abutting surface away from the structural wall, the abutting surface is configured to match with and abut against a bottom of the module body.

11. The adjustable support of claim 1, wherein the supporting ring has a plurality of second inner threads configured to couple with the outer threads of the supporting base.

12. The adjustable support of claim 1, wherein the supporting base comprises:
a tubular portion having the outer threads; and
a flange portion connected with the tubular portion, the supporting ring is located between the adapter and the flange portion.

13. The adjustable support of claim 1, wherein adjacent two of the outer threads define a pitch therebetween, a range of the pitch is between 0.5 mm and 20 mm.

14. The adjustable support of claim 13, wherein the supporting ring has a thickness, a range of a ratio of the thickness corresponding to the pitch is between 4 and 50.

15. An optical module, comprising:
a module body; and
a plurality of adjustable supports of claim 1 connected with a bottom of the module body and spaced apart from each other.

16. The optical module of claim 15, wherein the module body is a microscope module.

17. An adjustable support, comprising:
an adapter configured to be coupled with a module body, wherein the adapter has a plurality of first inner threads;
a supporting base detachably connected with the adapter, wherein the supporting base has a hollow space and a plurality of outer threads configured to couple with the first inner threads, wherein adjacent two of the outer threads define a pitch therebetween, a range of the pitch is between 0.5 mm and 20 mm;
a supporting ring movably connected around the supporting base; and
a supporting column penetrating through the hollow space and configured to abut against the adapter,
wherein when the supporting base is detached from the adapter, the supporting ring is configured to be moved relative to the supporting base to support the adapter.

18. The adjustable support of claim 17, wherein the supporting column and the adapter are arranged in a vertical direction, the first subsidiary supporting column has a first length along the vertical direction, the first inner surface of the supporting base has a second length along the vertical direction, the first length is larger than the second length.

19. The adjustable support of claim 17, wherein the supporting ring has a plurality of second inner threads configured to couple with the outer threads of the supporting base.

20. The adjustable support of claim 17, wherein the supporting base comprises:

a tubular portion having the outer threads; and a flange portion connected with the tubular portion, the supporting ring is located between the adapter and the flange portion.

<div align="center">

\*   \*   \*   \*   \*

</div>